Figure 1:
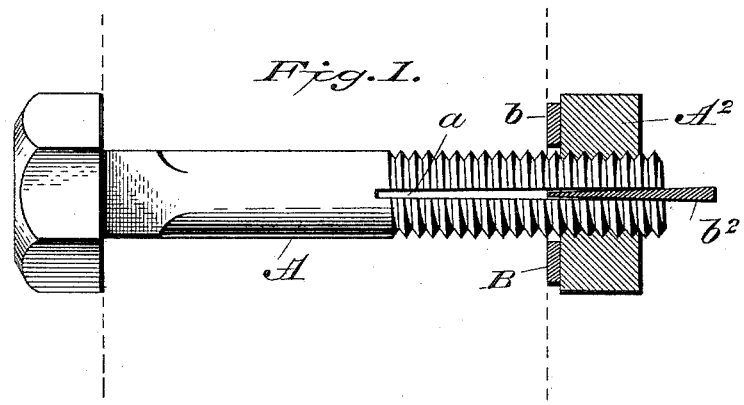

No. 642,066. Patented Jan. 30, 1900.
R. L. BARGELT.
NUT LOCK.
(Application filed Feb. 1, 1899.)
(No Model.)

WITNESSES:
L. S. Elliott.
R. M. Elliott.

INVENTOR:
Robert L. Bargelt,
by R. S. D. Newforth,
his attorney.

UNITED STATES PATENT OFFICE.

ROBERT L. BARGELT, OF WOODSTOCK, VIRGINIA.

NUT-LOCK.

SPECIFICATION forming part of Letters Patent No. 642,066, dated January 30, 1900.

Application filed February 1, 1899. Serial No. 704,140. (No model.)

*To all whom it may concern:*

Be it known that I, ROBERT L. BARGELT, a citizen of the United States, residing at Woodstock, in the county of Shenandoah and State of Virginia, have invented certain new and useful Improvements in Nut-Locks; and I do hereby declare the following to be a full, clear, and exact description of the invention, such as will enable others skilled in the art to which it appertains to make and use the same.

The object is to present a nut-lock in which the nut will be positively held from working loose, as from jars or vibrations incident to use, and in which removal when desired may be effected in a comparatively easy and ready manner.

The salient feature of my invention and that which differentiates it from any nut-lock heretofore constructed is that after the nut is seated any attempt to loosen the nut without first detaching the locking means will only tend to cause the nut to be more firmly seated upon the bolt against separation, the same being true should the nut work slightly loose under jars and vibrations.

The instrumentality employed in connection with the bolt for causing the effective locking of a nut thereon resides in a combined washer and locking-wedge, the washer in use to bear against the under side of the nut and to be moved longitudinally of the bolt when the nut is turned and the wedge to act as a follower to expand the threaded end of the bolt, so that when the nut is seated that portion beyond the nut outward to the end of the threaded portion of the bolt will be expanded and thus of larger diameter than that portion of the bolt within the nut, so that it will readily be seen that tendency of the nut to work off the bolt, as from jars and vibrations, such as occur, say, from the rapid passage of trains over a track, will effectively and positively be checked, the only way in which the nut can be removed being to remove the locking-wedge, and this can only be done by breaking the wedge loose from the washer or from the means by which it is held in operative relation to the washer.

The action of the locking-wedge is in effect that of a rivet, the only difference between this rivet and those in ordinary use being that it may be tightened without upsetting, this being effected merely by turning the nut.

The great advantage presented by this form of nut-lock is that when seated, say, in position against a fish-plate, it will be utterly impossible without destroying the wedge for mischievous or evil-disposed persons to loosen the nut even with the strongest wrench, so that accidents resulting from loosened nuts at railway-joints and fish-plates will be entirely obviated and safety of travel increased.

In the accompanying drawings, forming a part of this specification, and in which like letters of reference indicate corresponding parts, I have illustrated two forms of embodiment of my invention—that is to say, a preferred and a modified form—it being understood that other forms of embodiment of the same may be employed without departing from the spirit thereof, and in these drawings—

Figure 2:
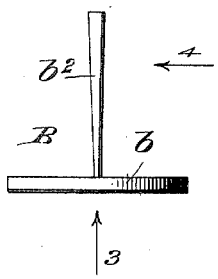
Figure 3:
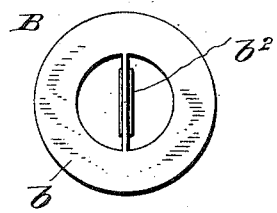
Figure 4:
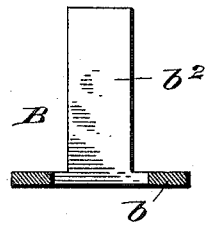
Figure 5:
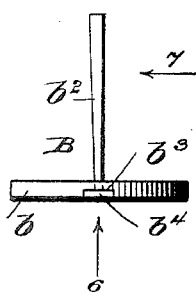
Figure 6:
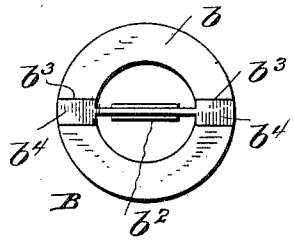
Figure 7:
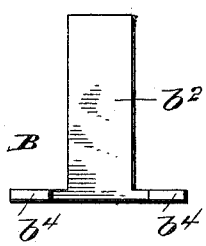

Figure 1 is a view in side elevation, partly in section, displaying a bolt with a nut held in place thereon by the locking-wedge. Fig. 2 is a detached view in elevation of the washer and locking-wedge shown in Fig. 1. Fig. 3 is a view in elevation of the same looking in the direction of the arrow 3, Fig. 2. Fig. 4 is a view in side elevation of the washer and locking-wedge, partly in section, looking in the direction of the arrow 4, Fig. 2. Fig. 5 is a detached detail view in elevation of a modified form of locking-wedge. Fig. 6 is a view in elevation of the same looking in the direction of the arrow 6, Fig. 5. Fig. 7 is a view in side elevation looking in the direction of the arrow 7, Fig. 5.

Referring to the drawings, A designates a bolt which may be of any ordinary construction and having one end portion provided with threads and having a longitudinal slot $a$ extending through the threaded portion and beyond, if necessary, and $A^2$ a nut engaging the threaded portion of the bolt, and as these parts may be of any preferred or desired construction a detailed description of them is deemed unnecessary.

The combined washer and locking-wedge B, which constitutes the gist of this invention, comprises a washer $b$ and a wedge $b^2$, the washer and wedge in this instance being integral and made of any suitable material, preferably of steel, stamped or otherwise formed to the desired shape.

Instead of having the wedge and washer integral, as shown in Fig. 2, the same may be made in two separate parts, and from the standpoint of economy and readiness of manufacture this latter form will in many instances be preferred. If made in separate parts, the washer $b$ will be provided with two alined recesses $b^3$, and the wedge at its base with laterally-extending arms $b^4$ for engaging the recesses $b^3$, as shown in Figs. 5 and 6. By this simple manner of assemblage of the locking-wedge and washer separation of the two when once seated on the bolt will be entirely obviated.

When a nut is to be secured in place, the washer and wedge are first slipped over the end of the bolt with the wedge in the slot of the bolt. The nut is then turned on the end of the bolt and in being seated draws the wedge into the slot, thereby expanding the outer end of the bolt and causing it to become larger in transverse diameter than the remaining threaded portion of the bolt, this expanding or diverging of the bifurcated end of the bolt being continued until the nut is seated. Now should the bolt and nut be used in a position where it would not be subjected to action of rust and it is desired to remove the nut it will only be necessary to give the wedge a few sharp lateral blows, when it will become detached from the washer where the parts are integral, as shown in Figs. 2, 3, and 4, or from the laterally-extending arms $b^4$, where the wedge and washer are detachable, as shown in Figs. 5, 6, and 7, when the nut may then be readily removed.

In case the nut and bolt are used in a position where the same are under ground, as in the laying of street-railways, where in a little while the whole bolt and nut are thickly incrusted with rust, the usual procedure of simply breaking the nut loose from the bolt will be resorted to.

The cost of manufacture of the washer and locking-wedge will be insignificant, as the parts may be stamped up out of a suitable material, and the cost of providing the bolt with a slot will be found to be but very slight.

It will be seen from the foregoing description that the nut-lock presented by this invention cannot fail to be of high efficiency in use and will fill a long-felt want and demand for a nut-lock that will under all conditions in use be thoroughly effective for the uses for which it is designed. It may be noted at this point that should the wedge become broken off, so that under the pressure of a wrench the bolt may be removed, yet the divergent members of the bifurcated end of the bolt will effectively prevent accidental separation of the nut from the bolt, as from jars, vibrations, and the like.

Having thus fully described my invention, what I claim as new, and desire to secure by Letters Patent of the United States, is—

In a nut-lock, the combination with a bolt provided with a longitudinal slot through its threaded portion, and a nut, of a locking device consisting of two separate members, a washer provided on one face with two alined recesses, and a wedge provided at its base with laterally-extending arms to engage the said recesses, the wedge, when in operative position adapted to fit within the slot of the bolt, and the nut to bear upon the washer, substantially as and for the purpose specified.

In testimony whereof I affix my signature in presence of two witnesses.

ROBERT L. BARGELT.

Witnesses:
R. G. DYRENFORTH,
R. M. ELLIOTT.